(12) United States Patent
Tanaka

(10) Patent No.: US 10,033,243 B2
(45) Date of Patent: Jul. 24, 2018

(54) ROTATING ELECTRICAL MACHINE FOR A VEHICLE

(71) Applicant: Mitsubishi Electric Corporation, Tokyo (JP)

(72) Inventor: Kazunori Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 359 days.

(21) Appl. No.: 14/911,750

(22) PCT Filed: Oct. 31, 2013

(86) PCT No.: PCT/JP2013/079557
§ 371 (c)(1),
(2) Date: Feb. 12, 2016

(87) PCT Pub. No.: WO2015/063924
PCT Pub. Date: May 7, 2015

(65) Prior Publication Data
US 2016/0204669 A1 Jul. 14, 2016

(51) Int. Cl.
*H02K 5/18* (2006.01)
*H02K 11/04* (2016.01)

(52) U.S. Cl.
CPC ............. *H02K 5/18* (2013.01); *H02K 11/046* (2013.01)

(58) Field of Classification Search
CPC .............................. H02K 5/18; H02K 11/046
USPC ................................................. 310/64, 68 D
See application file for complete search history.

(56) References Cited

U.S. PATENT DOCUMENTS

| 6,429,556 B1 * | 8/2002 | Nakamura | H01R 39/32 310/68 D |
| 2002/0185984 A1 | 12/2002 | Gold et al. | |
| 2008/0316786 A1 * | 12/2008 | Murakami | H02K 11/046 363/141 |

(Continued)

FOREIGN PATENT DOCUMENTS

| JP | 2004-508797 A | 3/2004 |
| JP | 3956076 B2 | 8/2007 |

(Continued)

OTHER PUBLICATIONS

International Search Report for PCT/JP2013/079557 dated Jan. 14, 2014.

(Continued)

*Primary Examiner* — Jeremy Luks
(74) *Attorney, Agent, or Firm* — Sughrue Mion, PLLC; Richard C. Turner

(57) ABSTRACT

A rotating electrical machine for a vehicle includes a rectifier fixed to a fixing portion of a casing. The rectifier includes a heat sink to which a rectifier element is mounted, and a circuit board configured to electrically connect a stator lead routed out of a stator to the rectifier element. The heat sink includes an element mounting portion, and an axial fin protruding radially outward from the element mounting portion. A supporting portion configured to support the axial fin along an axial direction is formed on one of the casing and the axial fin. The supporting portion is arranged at a position away from the fixing portion so as to be adjacent to the stator lead guide when the rectifier is viewed along the axial direction.

4 Claims, 8 Drawing Sheets

(56) References Cited

U.S. PATENT DOCUMENTS

| | | |
|---|---|---|
| 2009/0033181 A1 | 2/2009 | Hamada |
| 2010/0308700 A1 | 12/2010 | Isoda et al. |
| 2011/0193432 A1 | 8/2011 | Takechi et al. |
| 2011/0273042 A1 | 11/2011 | Isoda et al. |
| 2014/0339931 A1* | 11/2014 | Tanaka ................. H02K 11/046 |
| | | 310/52 |
| 2015/0162846 A1* | 6/2015 | Yokoyama .............. H01L 23/36 |
| | | 363/141 |

FOREIGN PATENT DOCUMENTS

| | | |
|---|---|---|
| JP | 4126813 B2 | 7/2008 |
| JP | 2009-207274 A | 9/2009 |
| JP | 2010-283997 A | 12/2010 |
| JP | 2011-166948 A | 8/2011 |
| JP | 2011-239542 A | 11/2011 |
| JP | 2012029521 A * | 2/2012 |
| WO | 2013/118703 A1 | 8/2013 |
| WO | 2013/132653 A1 | 9/2013 |

OTHER PUBLICATIONS

Communication dated Oct. 19, 2017 from the European Patent Office in counterpart European application No. 13896228.7.

* cited by examiner

ROTATING ELECTRICAL MACHINE FOR A VEHICLE

CROSS REFERENCE TO RELATED APPLICATIONS

This application is a National Stage of International Application No. PCT/JP2013/079557 filed Oct. 31, 2013, the contents of which are incorporated herein by reference in their entirety.

TECHNICAL FIELD

The present invention relates to a rotating electrical machine for a vehicle including a rotator and a stator.

BACKGROUND ART

Hitherto, there has been known an AC generator for a vehicle including a frame configured to house a rotator and a stator, and a rectifier fixed to an outer end surface of the frame. The rectifier includes a large-diameter fin, which is fastened to a plurality of fastening and fixing portions circumferentially spaced from one another and protruding from the frame, and has rectifier elements arranged thereon. The frame has protruding portions in contact with the large-diameter fin protruding from the frame so as to suppress vibration of the large-diameter fin. The protruding portions are each located circumferentially in the middle between two fastening and fixing portions (see, for example, Patent Literature 1).

Further, to enhance a cooling performance of a cooling fin by enlarging a heat dissipation surface of the cooling fin, there has been hitherto known an AC generator for a vehicle including a rectifier having a plurality of slits formed along a ventilation direction in an outer peripheral portion of the cooling fin, to which a plurality of rectifier elements are mounted. The cooling fin is fixed via a plurality of rivets to a terminal block, which is configured to electrically connect an output line from a stator to each of the rectifier elements. The rivets are located on an inner side with respect to the outer peripheral portion of the cooling fin (see, for example, Patent Literature 2).

CITATION LIST

Patent Literature

[PTL 1] JP 4126813 B2
[PTL 2] JP 3956076 B2

SUMMARY OF INVENTION

Technical Problem

However, in the AC generator for a vehicle disclosed in Patent Literature 1, the large-diameter fin is a mere plate-like member, and thus, it is difficult to further improve the cooling performance of the large-diameter fin.

Further, in the related-art AC generator for a vehicle disclosed in Patent Literature 2, the outer peripheral portion of the cooling fin is a cantilever when viewed from each of the rivets, which is likely to cause a vibration of the cooling fin. Further, when, for the purpose of further enlarging the heat dissipation surface of the cooling fin, a thickness of the outer peripheral portion of the cooling fin is increased as compared to that of the remaining portion, a weight of the outer peripheral portion of the cooling fin increases, thereby causing the vibration of the cooling fin to be larger.

The present invention has been made to solve the problems described above, and has an object to provide a rotating electrical machine for a vehicle, which is capable of improving the cooling performance of a heat sink and suppressing the vibration of a rectifier.

Solution to Problem

According to one embodiment of the present invention, there is provided a rotating electrical machine for a vehicle, including: a rotator, which is configured to be rotated about an axis; a stator, which is arranged coaxially with the rotator, and includes stator winding; a casing, which is configured to support the rotator and the stator; and a rectifier, which is fixed to a fixing portion of the casing, the rectifier including: a rectifier element; a heat sink to which the rectifier element is mounted, the heat sink being arranged so as to be opposed to the casing along an axial direction; and a circuit board, which is configured to electrically connect a stator lead routed out of the stator winding to the rectifier element, the heat sink including: an element mounting portion, to which the rectifier element is mounted; and an axial fin protruding radially outward from the element mounting portion, the circuit board including a stator lead guide configured to guide the stator lead, one of the axial fin and the casing including formed thereon a supporting portion configured to support the axial fin along the axial direction, the supporting portion being arranged at a position away from the fixing portion so as to be adjacent to the stator lead guide when the rectifier is viewed along the axial direction.

Advantageous Effects of Invention

According to the rotating electrical machine for a vehicle of the one embodiment of the present invention, the axial fin is configured to protrude radially outward from the element mounting portion, and hence an area of a heat dissipation surface of the heat sink can be increased to improve the cooling performance of the heat sink. Further, the supporting portion formed on any one of the axial fin and the casing is configured to support the axial fin along the axial direction, and hence the vibration of the axial fin can be suppressed by the supporting portion. With this, the vibration of the heat sink can be suppressed and the vibration of the rectifier can also be suppressed.

DESCRIPTION OF EMBODIMENTS

First Embodiment

Figure 1:
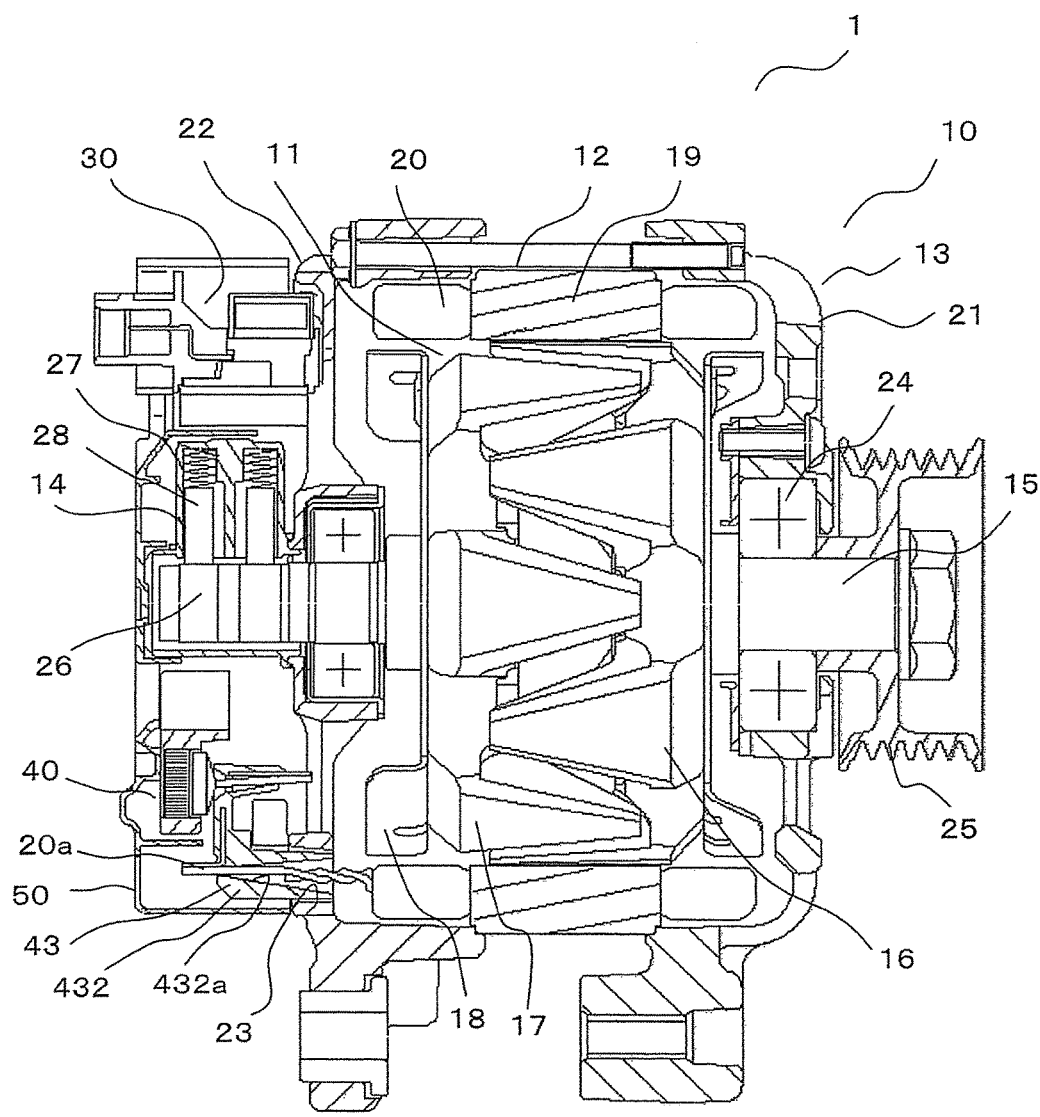
FIG. 1 is a sectional view for illustrating an AC generator according to a first embodiment of the present invention.

FIG. 1 is a sectional view for illustrating an AC generator for a vehicle according to a first embodiment of the present invention. In FIG. 1, an AC generator 1 for a vehicle (hereinafter simply referred to as AC generator 1) serving as a rotating electrical machine for a vehicle includes a power generator body (rotating electrical machine body) 10, a voltage regulator 30 and a rectifier 40 that are arranged outside the power generator body 10, and a protective cover 50, which is mounted to the power generator body 10, and is configured to cover the voltage regulator 30 and the rectifier 40.

The power generator body 10 includes a rotor 11 configured to be rotated about an axis, a tubular stator 12 arranged on a radially outer side with respect to the rotor 11 and surrounding an outer periphery of the rotor 11, a casing 13 configured to support the rotor 11 and the stator 12, and a brush device 14 configured to feed power to the rotor 11.

The rotor 11 includes a shaft 15 arranged on the axis of the rotor 11 and a rotor body 16 arranged on the shaft 15 and received in the casing 13. The rotor body 16 includes field wiring (not shown) through which an exciting current generated by power feeding from the brush device 14 passes to generate a magnetic flux, and a rotor core 17 having the field wiring arranged therearound and magnetic poles formed by the magnetic flux generated by the field wiring. Cooling fans 18 configured to generate cooling air are arranged on both end portions of the rotor body 16 in an axial direction.

The stator 12 is arranged coaxially with the rotor 11. Further, the stator 12 includes a cylindrical (annular) stator core 19 surrounding the rotor body 16, and stator winding 20 arranged around the stator core 19 and configured to generate an AC electromagnetic force through change in magnetic flux from the field wiring as the rotor 11 rotates.

The stator core 19 is made of a magnetic material (for example, iron). A stator lead 20a as an electric connection end is routed from the stator winding 20 to the outside of the casing 13. The stator lead 20a is connected to the rectifier 40 outside the casing 13.

The casing 13 includes a front bracket 21 and a rear bracket 22 each having a substantially bowl-like shape. The front bracket 21 and the rear bracket 22 are fixed to each other by a plurality of bolts under a state in which opening portions thereof are opposed to each other with the stator 12 being sandwiched therebetween.

The shaft 15 passes through both the front bracket 21 and the rear bracket 22. Further, the shaft 15 is rotatably supported by the front bracket 21 and the rear bracket 22 through intermediation of a bearing 24. A pulley 25 around which a transmission belt (not shown) coupled to an internal combustion engine is wound, is fixed to an end portion of the shaft 15 protruding from the front bracket 21 to the outside of the casing 13.

The brush device 14 includes a pair of slip rings 26 fixed to an end portion of the shaft 15 protruding from the rear bracket 22 to the outside of the casing 13, and a pair of brushes 28 that are individually brought into contact with the slip rings 26 under a state of being held by a brush holder 27.

The slip rings 26 are electrically connected to the field wiring. The power is fed to the field wiring from the brushes 28 through the slip rings 26. The slip rings 26 slide on the brushes 28, respectively, while the shaft 15 rotates.

The voltage regulator 30 is arranged on the radially outer side with respect to the brush holder 27. The voltage regulator 30 is configured to regulate a magnitude of an AC voltage generated by the stator 12.

Figure 2:
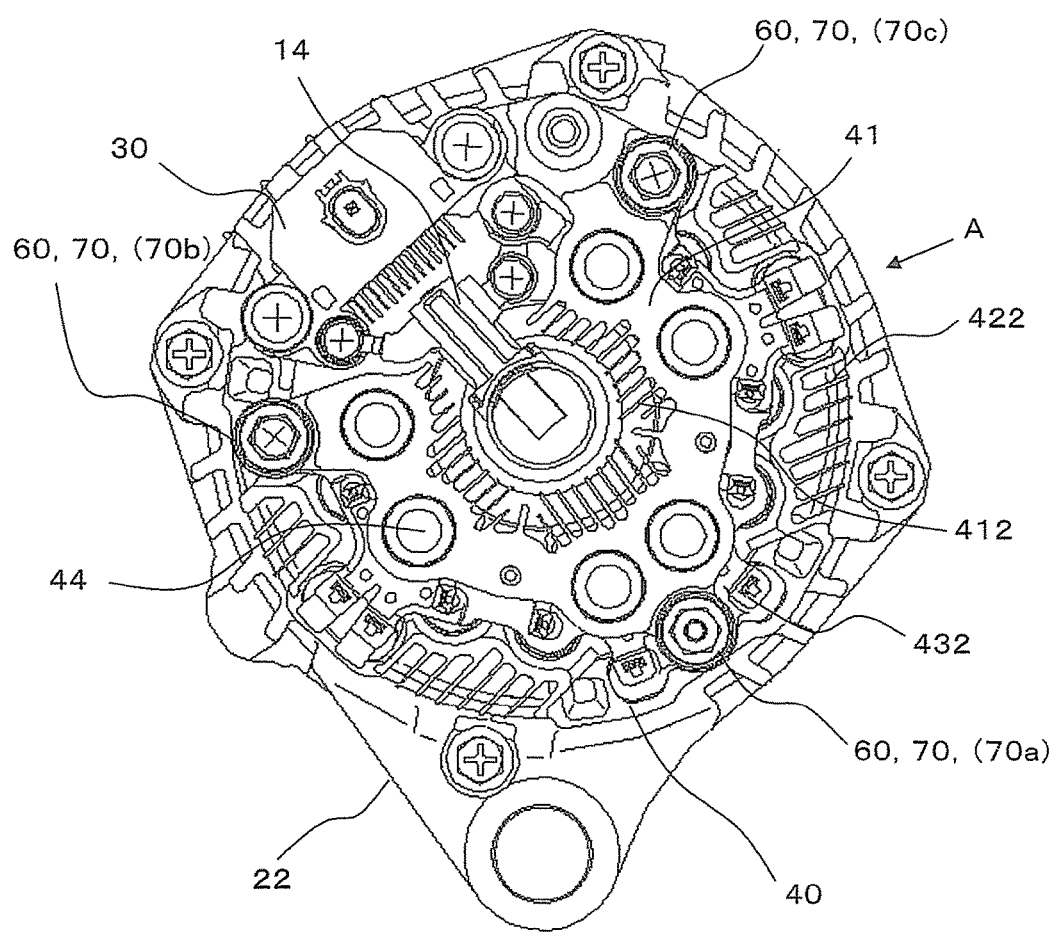
FIG. 2 is a rear view for illustrating the AC generator when viewed along an axial direction under a state in which a protective cover illustrated in FIG. 1 is removed.
Figure 3:
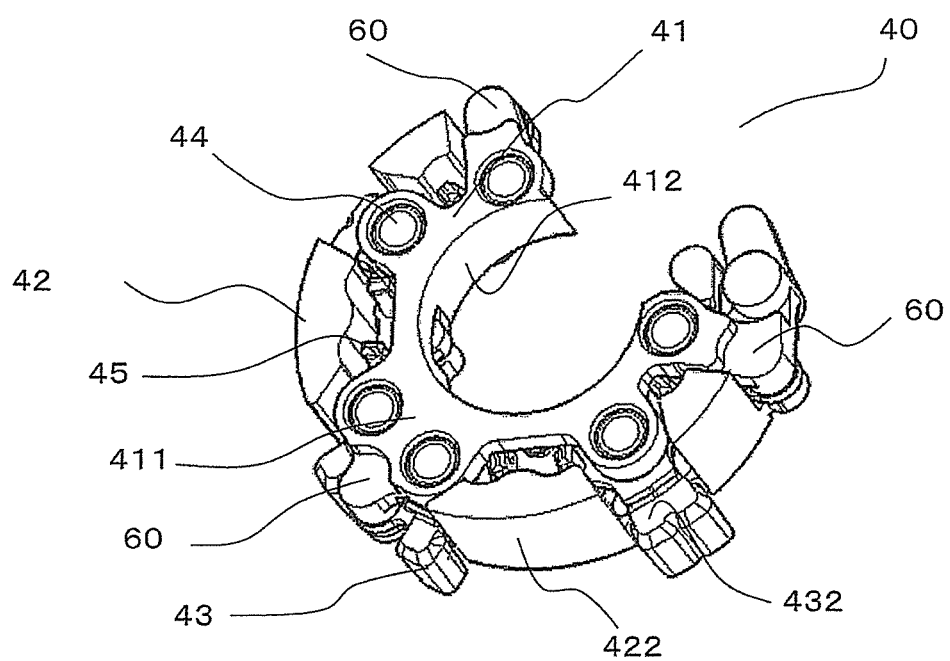
FIG. 3 is a perspective view for illustrating a rectifier illustrated in FIG. 2.

FIG. 2 is a rear view for illustrating the AC generator 1 viewed along the axial direction under a state in which the protective cover 50 illustrated in FIG. 1 is removed. Further, FIG. 3 is a perspective view for illustrating the rectifier 40 illustrated in FIG. 2. Still further, FIG. 4 is a plan view for illustrating a state in which the rectifier 40 illustrated in FIG. 3 is disassembled.

As illustrated in FIG. 1 to FIG. 4, the rectifier 40 includes a positive-electrode side heat sink 41 arranged at a position away from the rear bracket 22 in the axial direction, a negative-electrode side heat sink 42 arranged between the rear bracket 22 and the positive-electrode side heat sink 41, and a circuit board 43 arranged between the positive-electrode side heat sink 41 and the negative-electrode side heat sink 42. The rectifier 40 further includes positive-electrode side rectifier elements 44 mounted to the positive-electrode side heat sink 41 and negative-electrode side rectifier elements (rectifier elements) 45 mounted to the negative-electrode side heat sink 42.

Figure 4:
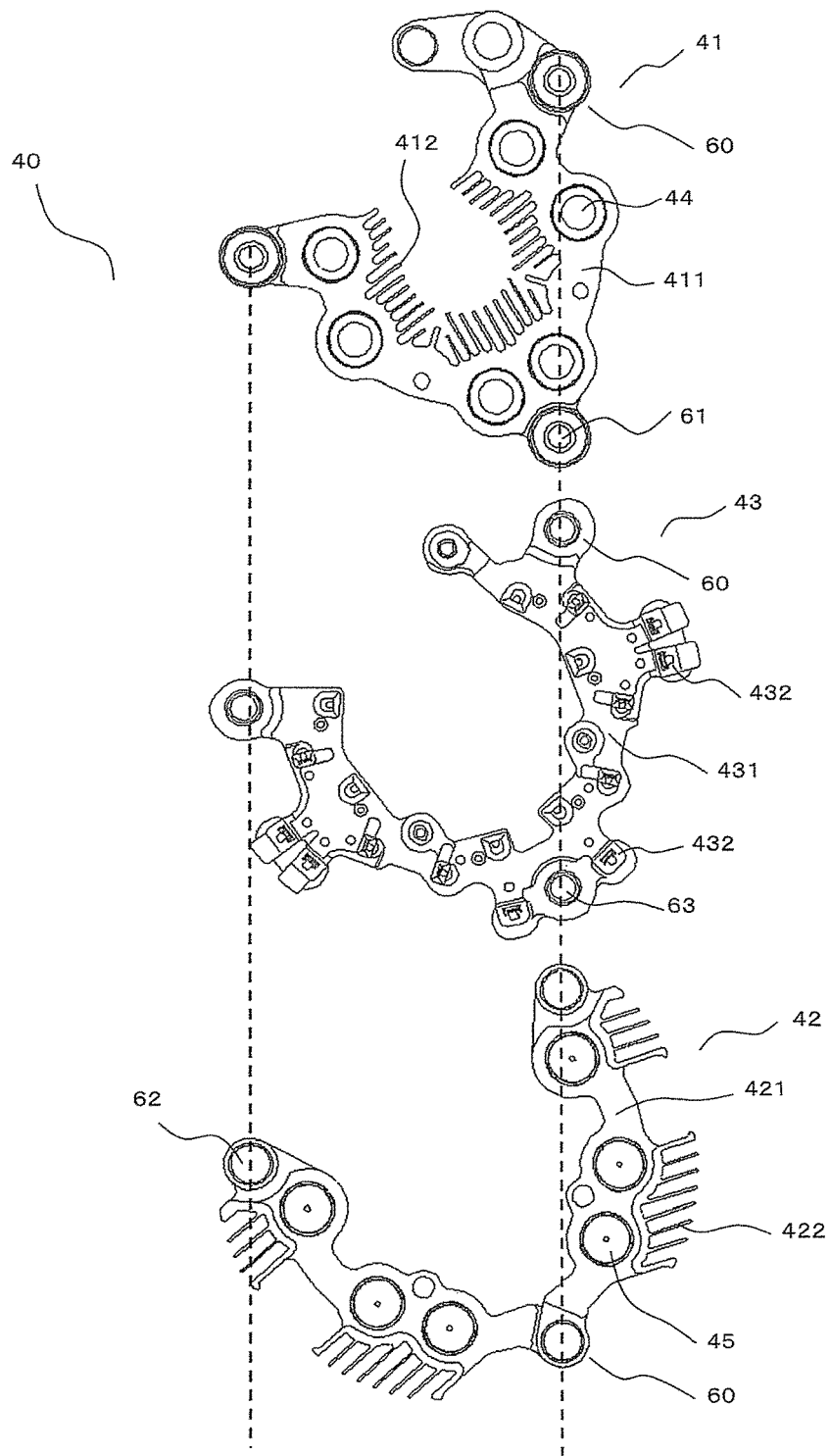
FIG. 4 is a plan view for illustrating a state in which the rectifier illustrated in FIG. 3 is disassembled.

As illustrated in FIG. 3 and FIG. 4, the positive-electrode side heat sink 41 includes a plate-like positive-electrode element mounting portion 411 formed into a substantially C-shape, and a plurality of plate-like positive-electrode side axial fins 412 protruding from the positive-electrode element mounting portion 411 radially inward and configured to cause a cooling flow to pass therethrough along the axial direction.

The positive-electrode element mounting portion 411 is arranged so as to be opposed to the rear bracket 22 with the negative-electrode side heat sink 42 and the circuit board 43 therebetween. A plurality of (in this example, six) positive-electrode side rectifier elements 44 are mounted to the positive-electrode element mounting portion 411.

The positive-electrode side rectifier elements 44 are arranged so as to be circumferentially spaced from one another. Further, the positive-electrode side rectifier elements 44 are mounted to the positive-electrode element mounting portion 411 under a state of passing through the positive-electrode element mounting portion 411 along the axial direction. A dimension in the axial direction (thickness) of the positive-electrode element mounting portion 411 is set to be a dimension (thickness) equivalent to a dimension in the axial direction (thickness) of the positive-electrode side rectifier elements 44.

The positive-electrode side axial fins 412 are arranged in an inner peripheral portion of the positive-electrode element mounting portion 411 so as to be circumferentially spaced from one another. Further, the positive-electrode side axial fins 412 extend from the positive-electrode element mounting portion 411 toward the rear bracket 22 along the axial direction. A dimension in the axial direction of the positive-electrode side axial fins 412 is set to be larger than the dimension in the axial direction of the positive-electrode element mounting portion 411.

Figure 5:
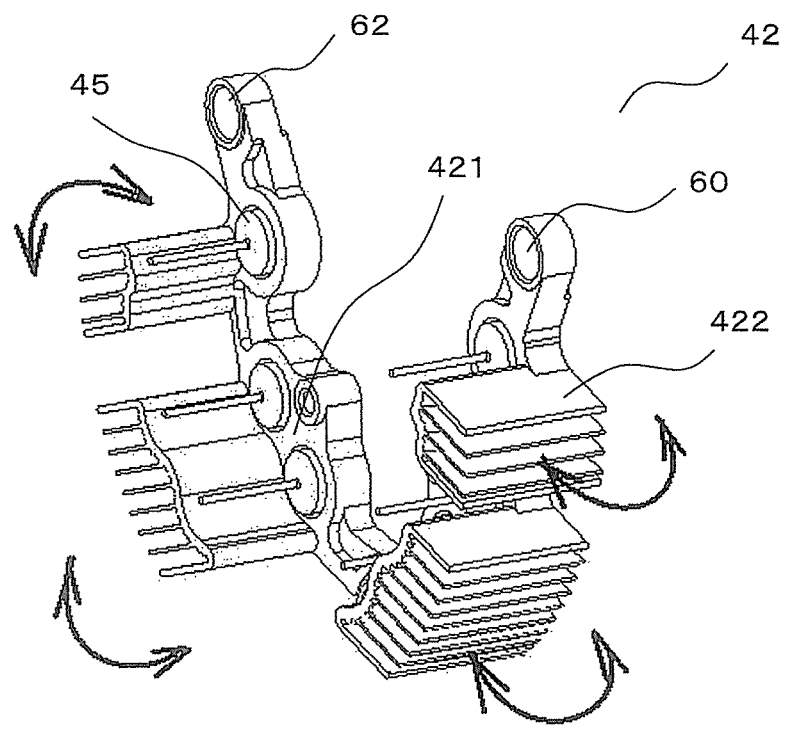
FIG. 5 is a perspective view for illustrating a negative-electrode side heat sink illustrated in FIG. 4.

FIG. 5 is a perspective view for illustrating the negative-electrode side heat sink 42 illustrated in FIG. 4. As illustrated in FIG. 3 to FIG. 5, the negative-electrode side heat sink 42 includes a plate-like negative-electrode element mounting portion (element mounting portion) 421 formed into a substantially C-shape, and a plurality of plate-like negative-electrode side axial fins (axial fins) 422 protruding from the negative-electrode element mounting portion 421 radially outward and configured to cause a cooling flow to pass therethrough along the axial direct ion. Further, the negative-electrode side heat sink 42 is arranged so as to be opposed to the rear bracket 22.

The negative-electrode element mounting portion 421 is arranged so as to be spaced from the rear bracket 22 along the axial direction. A plurality of (in this example, six) negative-electrode side rectifier elements 45 are mounted to the negative-electrode element mounting portion 421.

The negative-electrode side rectifier elements 45 are arranged so as to be circumferentially spaced from one another. Further, the negative-electrode side rectifier elements 45 are mounted to the negative-electrode element mounting portion 421 under a state of passing through the negative-electrode element mounting portion 421 along the axial direction. A dimension in the axial direction (thickness) of the negative-electrode element mounting portion 421 is set to be a dimension (thickness) equivalent to a dimension in the axial direction (thickness) of the negative-electrode side rectifier elements 45.

The negative-electrode side axial fins 422 are arranged in an inner peripheral portion of the negative-electrode element mounting portion 421 so as to be circumferentially spaced from one another. Further, as illustrated in FIG. 3 and FIG. 5, the negative-electrode side axial fins 422 extend from the negative-electrode element mounting portion 421 in a direction away from the rear bracket 22 along the axial direction. A dimension in the axial direction of the negative-electrode side axial fins 422 is set to be larger than the dimension in the axial direction of the negative-electrode element mounting portion 421.

A metal is used as a material of the positive-electrode side heat sink 41 and a material of the negative-electrode side heat sink 42. In this example, aluminum is used for both of the sinks.

The circuit board 43 includes a molded resin (insulating material) and a plurality of insert conductors (not shown) that are integral with the molded resin. The circuit board 43 connects the positive-electrode side rectifier elements 44 and the negative-electrode side rectifier elements 45 with the insert conductors so that the positive-electrode side rectifier elements 44 and the negative-electrode side rectifier elements 45 form a bridge circuit. The molded resin is molded into a substantially C-shape using an insulating resin such as polybutylene terephthalate (PBT). The plurality of insert conductors are integral with the molded resin using insert molding.

The molded resin of the circuit board 43 includes a base 431 having a substantially C-shape in which the insert conductors are insert-molded, and a plurality of (in this example, four) stator lead guides 432 formed on the base 431 so as to be circumferentially spaced from one another.

The stator lead guides 432 are formed so as to be circumferentially adjacent to the negative-electrode side axial fins 422 when the rectifier 40 is viewed along the axial direction. Further, at least part (in this example, two) of the stator lead guides 432 are formed so as to be circumferentially sandwiched between the negative-electrode side axial fins 422, respectively, when the rectifier 40 is viewed along the axial direction. Further, when the rectifier 40 is viewed along the axial direction, a radially outermost position formed by connecting radially outermost ends of the negative-electrode side axial fins 422 and a radially outermost position formed by connecting radially outermost ends of the stator lead guides 432 completely overlap. This forms a structure in which, when the rectifier 40 is viewed along the axial direction, the negative-electrode side axial fins 422 are arranged on both sides in the circumferential direction of at least part of the stator lead guides 432, the negative-electrode element mounting portion 421 is arranged on the radially inner side with respect to the stator lead guides 432, and the negative-electrode side heat sink 42 surrounds three sides of at least part of the stator lead guides 432.

Further, as illustrated in FIG. 1, guide holes 432a are formed in the stator lead guides 432 so as to pass through the stator lead guides 432 in the axial direction. The stator lead guides 432 are configured to guide the stator leads 20a to the insert conductors of the circuit board 43 under a state in which the stator leads 20a are caused to pass through the guide holes 432a, respectively.

Figure 6:
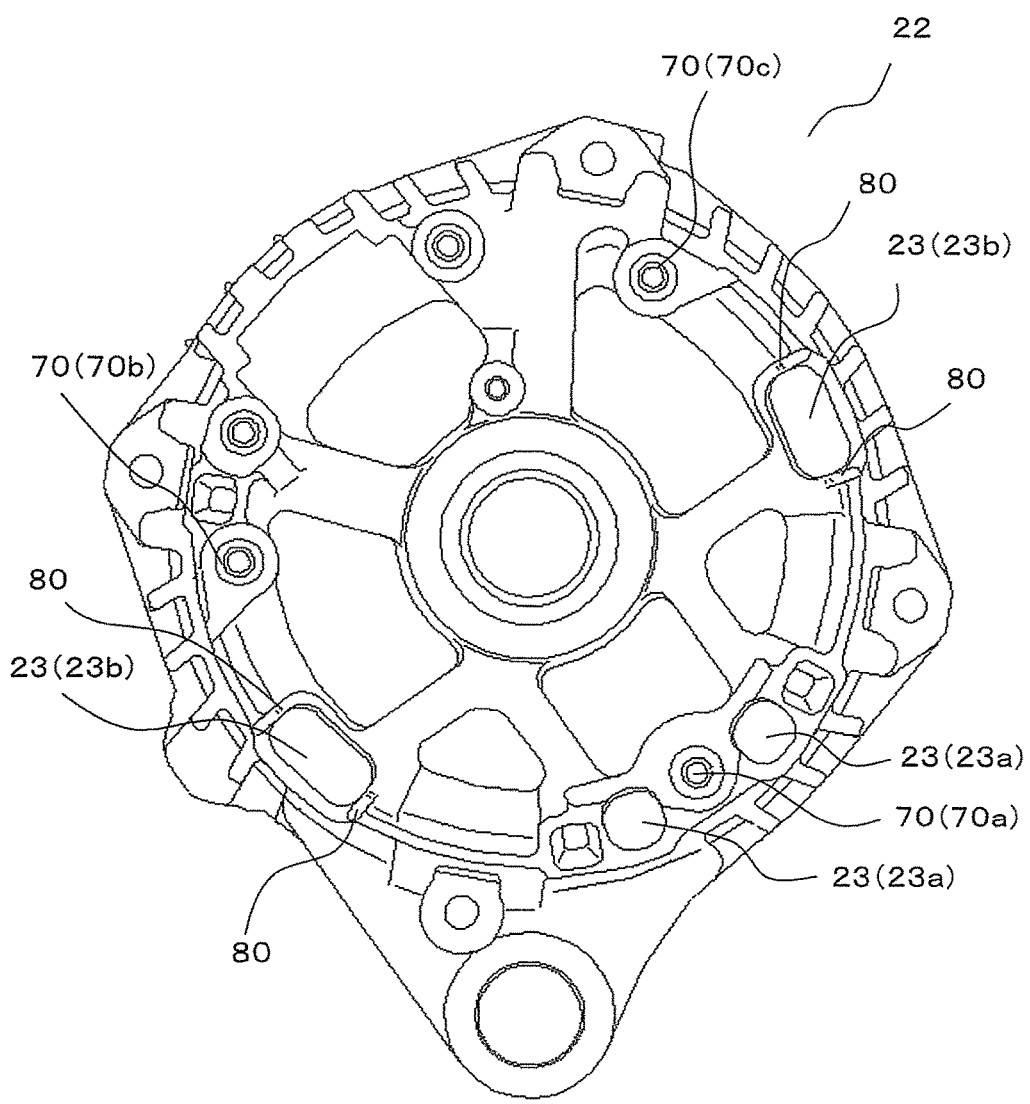
FIG. 6 is a plan view for illustrating a state in which a rear bracket illustrated in FIG. 1 is viewed from a rear in the axial direction.

FIG. 6 is a plan view for illustrating a state in which the rear bracket 22 illustrated in FIG. 1 is viewed from a rear surface on a rear side (rear side) in the axial direction. As illustrated in FIG. 6, a plurality of (in this example, three) fixing portions 70 (70a, 70b, and 70c) are formed on the rear bracket 22 so as to be circumferentially spaced from one another. As illustrated in FIG. 2, a plurality of (in this example, three) mounting portions 60 are formed on the rectifier 40 so as to correspond to positions of the fixing portions 70, respectively. The mounting portions 60 of the rectifier 40 are fastened and fixed to the fixing portions 70 of the rear bracket 22 with fasteners (for example, bolts), respectively. As illustrated in FIG. 3, the rectifier 40 is fixed to the rear bracket 22 under a state in which the negative-electrode side heat sink 42, the circuit board 43, and the positive-electrode side heat sink 41 are stacked in order.

As illustrated in FIG. 4, the mounting portions 60 of the rectifier 40 are formed by stacking mounting forming portions 61 formed on the positive-electrode element mounting portion 411, mounting forming portions 62 formed on the negative-electrode element mounting portion 421, and mounting forming portions 63 formed on the base 431. The mounting forming portions 61, 62, and 63 are formed at three places, i.e., around both end portions and a center portion of the negative-electrode element mounting portion 421, the positive-electrode element mounting portion 411, and the base 431 each having a substantially C-shape, respectively. In this example, the mounting portion 60 located at the center portion of the rectifier 40 is fixed to the fixing portion 70a of the three fixing portions 70, and the mounting portions 60 located around both the end portions of the rectifier 40 are fixed to the fixing portions 70b and 70c, respectively, which are the remaining two fixing portions 70 of the three fixing portions 70.

A plurality of (in this example, four) through holes 23 are formed in the rear bracket 22 so as to correspond to the positions of the stator leads 20a, respectively. Parts of the through holes 23 are located circumferentially away from the fixing portions 70 when the rear bracket 22 is viewed along the axial direction. In this example, two through holes 23 of the four through holes 23 are through holes 23a adjacent to the fixing portions that are formed on both sides in the circumferential direction of the fixing portion 70a so as to be adjacent to the fixing portion 70a, and the remaining two through holes 23 are through holes 23b away from the fixing portions, which are formed at positions away from the fixing portions 70. The through holes 23b away from the fixing portions are formed around the middle between the fixing portions 70b and 70c and the fixing portion 70a.

As illustrated in FIG. 1, parts of the stator lead guides 432 of the circuit board 43 are inserted into the through holes 23, respectively. The stator leads 20a routed out of the stator winding 20 reach the outside of the casing 13 through the guide holes 432a in the stator lead guides 432 inserted into the through holes 23 and connected to the insert conductors of the circuit board 43, thereby being electrically connected to the negative-electrode side rectifier elements 45 and the positive-electrode side rectifier elements 44, respectively.

Further, a plurality of (in this example, four) supporting portions 80 that protrude from the rear bracket 22 toward the rectifier 40 along the axial direction are formed on the rear bracket 22. The supporting portions 80 are integral with the rear bracket 22 and are arranged so as to be circumferentially spaced from one another. Further, the supporting portions 80 are arranged at positions closer to the through holes 23b away from the fixing portions than the fixing portions 70 when the rear bracket 22 is viewed along the axial direction. In this example, the supporting portions 80 are formed at positions circumferentially sandwiching the through holes 23b away from the fixing portions (on both sides in the circumferential direction), respectively. Therefore, the supporting portions 80 are formed at positions away from the fixing portions 70 and circumferentially sandwiching the stator lead guides 432 (that is, positions circumferentially adjacent to the stator lead guides 432), respectively, when the rectifier 40 is viewed along the axial direction.

Figure 7:
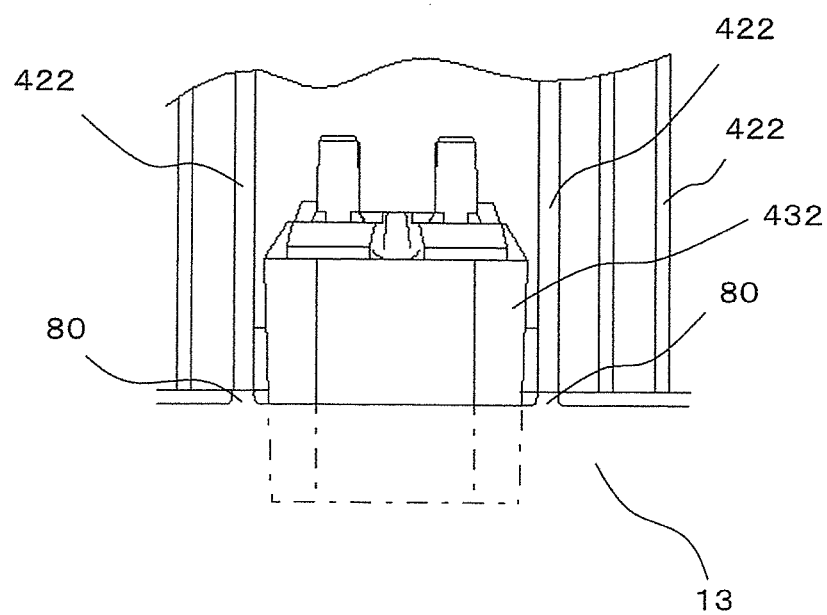
FIG. 7 is an enlarged schematic view for illustrating the rectifier when viewed along the arrow A of FIG. 2.

FIG. 7 is an enlarged schematic view for illustrating the rectifier 40 viewed along the arrow A of FIG. 2. As illustrated in FIG. 7, end portions of the supporting portions 80 protruding from the rear bracket 22 are held in contact with end portions in the axial direction of parts of the negative-electrode side axial fins 422 that are opposed to the supporting portions 80, respectively. With this, the supporting portions 80 supports, along the axial direction, the negative-electrode side axial fins 422 located on both sides in the circumferential direction of the stator lead guides 432, respectively (parts of the negative-electrode side axial fins 422) of the plurality of negative-electrode side axial fins 422.

The protective cover 50 is fixed to the rear bracket 22, and protects the brush device 14, the voltage regulator 30, and the rectifier 40.

Next, operation of the AC generator 1 is described. When a current is supplied from a battery (not shown) to the field wiring through the brushes 28 and the slip rings 26, a magnetic flux is generated and the rotor core 17 is magnetized. In this state, when the rotor 11 is rotated by a driving force from the internal combustion engine (engine), the linked magnetic flux changes to generate an electromotive force in the stator winding 20. The AC electromotive force is rectified to a DC electromotive force via the rectifier 40, and the electromotive force is charged in the battery after the magnitude thereof is regulated by the voltage regulator 30.

In the AC generator 1, the negative-electrode side axial fins 422 protrude radially outward from the element mounting portion 421, and thus, the area of a heat dissipation surface of the negative-electrode side heat sink 42 can be increased to improve a cooling performance of the negative-electrode side heat sink 42. Further, the supporting portions 80 configured to support the negative-electrode side axial fins 422 along the axial direction are formed on the rear bracket 22, and thus, the negative-electrode side axial fins 422 can be directly received by the supporting portions 80. This enables suppression of vibration of the negative-electrode side heat sink 42 in the axial direction and in the radial direction as indicated by the arrows of FIG. 5 even when the rectifier 40 mounted on a vehicle suffers vibration to a large extent, and vibration of the rectifier 40 can be suppressed.

Further, the supporting portions 80 are arranged at positions away from the fixing portions 70 of the rear bracket 22 so as to be adjacent to the stator lead guides 432, respectively, when the rectifier 40 is viewed along the axial direction, and thus, vibration of the stator lead guides 432 can be suppressed. This can prevent damage to the stator leads 20a passing through the guide holes 432a, respectively, to improve reliability of the AC generator 1.

Further, the supporting portions 80 are formed at positions circumferentially sandwiching the stator lead guides 432, respectively, when the rectifier 40 is viewed along the axial direction, and thus, vibration of the stator lead guides 432 can be suppressed with further reliability. This enables prevention of damage to the stator leads 20a with more reliability.

Further, dimensions of the axial fins 412 and 422 in the axial direction are larger than dimensions of the element mounting portions 411 and 421 in the axial direction, respectively, and thus, the area of the heat dissipation surface can be increased to improve the cooling performance. In this case, even when the dimensions of the negative-electrode side axial fins 422 are increased to increase weights of the negative-electrode side axial fins 422, vibration of the negative-electrode side axial fins 422 can be effectively suppressed by the supporting portions 80.

Note that, in the embodiment described above, the supporting portions 80 protruding from the rear bracket 22 are held in contact with the negative-electrode side axial fins 422, but a buffer member or the like may be arranged between the supporting portion 80 and the negative-electrode side axial fin 422.

Second Embodiment

In the first embodiment, the supporting portions 80 are formed on the rear bracket 22. In a second embodiment of the present invention, a case in which the supporting portions 80 are formed on the negative-electrode side axial fins 422 is described.

Figure 8:
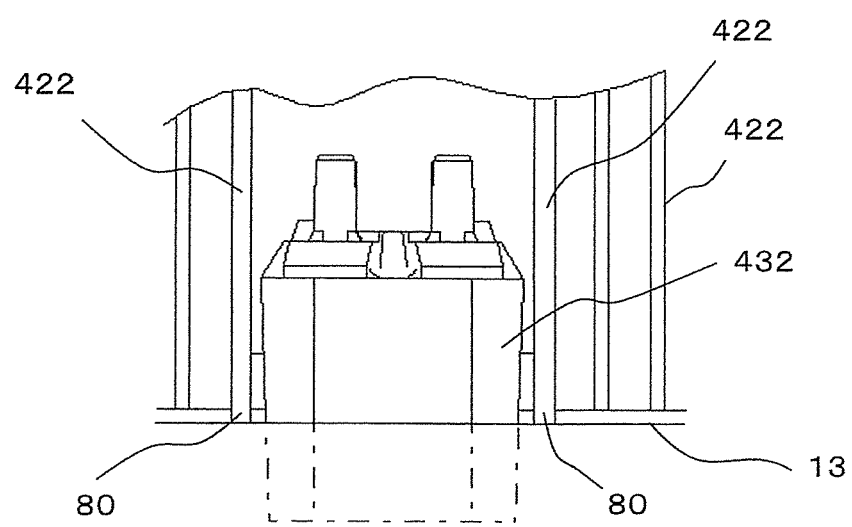
FIG. 8 is an enlarged side view for illustrating a principal part including supporting portions of an AC generator according to a second embodiment of the present invention.

FIG. 8 is an enlarged side view for illustrating a principal part including the supporting portions 80 of the AC generator 1 according to the second embodiment of the present invention. Note that, FIG. 8 is a view corresponding to FIG. 7 for illustrating the first embodiment. As illustrated in FIG. 8, a plurality of supporting portions 80 protruding from the negative-electrode side axial fins 422 toward the rear bracket 22 along the axial direction are formed at end portions of parts of the negative-electrode side axial fins 422 in the axial direction, respectively. In this example, the negative-electrode side heat sink 42 and the supporting portions 80 are a single material obtained by integral molding. End portions of the supporting portions 80 are held in contact with the rear bracket 22 opposed to the supporting portions 80.

Further, similarly to the case of the first embodiment, the supporting portions 80 are arranged at positions close to the through holes 23b away from the fixing portions when the rear bracket 22 is viewed along the axial direction. In this example, the supporting portions 80 are formed at end portions of the negative-electrode side axial fins 422 in the axial direction, which are arranged at positions circumferentially sandwiching the through holes 23b away from the fixing portions, respectively. Therefore, the supporting portions 80 are arranged at positions away from the fixing portions 70 of the rear bracket 22 so as to be adjacent to the stator lead guides 432 when the rectifier 40 is viewed along the axial direction. The remaining configuration is similar to that of the first embodiment.

In the AC generator 1, also, the supporting portions 80 formed on the negative-electrode side axial fins 422 support the negative-electrode side axial fins 422 along the axial direction, and thus, vibration of the negative-electrode side heat sink 42 can be suppressed. This enables, similarly to the case of the first embodiment, suppression of vibration of the rectifier 40 to prevent damage to the stator leads 20a.

Note that, in the embodiment described above, the supporting portions 80 protruding from the negative-electrode side axial fins 422 are held in contact with the rear bracket 22, but, similarly to the case of the first embodiment, a buffer member or the like may be arranged between the supporting portion 80 and the rear bracket 22.

Further, the embodiments described above are merely examples, and the arrangements, the numbers, the shapes, and the like of structural elements such as the axial fins 412 and 422 and the stator lead guides 432 are not limited to those described herein. For example, in the embodiments described above, the supporting portions 80 are formed only at positions circumferentially sandwiching the stator lead guides 432, respectively, but, insofar as the structure of the rear bracket 22 permits, the supporting portions 80 may be formed at a plurality of positions.

Further, in the embodiments described above, the present invention is applied to the AC generator 1 for a vehicle, but the present invention may be applied to a generator motor serving as a rotating electrical machine for a vehicle.

The invention claimed is:

1. A rotating electrical machine for a vehicle, comprising:
a rotator, which is configured to be rotated about an axis;
a stator, which is arranged coaxially with the rotator, and includes stator winding;
a casing, which is configured to support the rotator and the stator; and
a rectifier, which is fixed to a fixing portion of the casing, the rectifier including:
a rectifier element;
a heat sink to which the rectifier element is mounted, the heat sink being arranged so as to be opposed to the casing along an axial direction; and
a circuit board, which is configured to electrically connect a stator lead routed out of the stator winding to the rectifier element,
the heat sink including: an element mounting portion, to which the rectifier element is mounted; and an axial fin protruding radially outward from the element mounting portion,
the circuit board including a stator lead guide configured to guide the stator lead,
one of the axial fin and the casing including formed thereon a supporting portion configured to support the axial fin along the axial direction,
the supporting portion being arranged at a position away from the fixing portion so as to be adjacent to the stator lead guide when the rectifier is viewed along the axial direction.

2. A rotating electrical machine for a vehicle according to claim 1, wherein the supporting portion comprises supporting portions each arranged at a position circumferentially sandwiching the stator lead guide.

3. A rotating electrical machine for a vehicle according to claim 1, wherein a dimension of the axial fin in the axial direction is larger than a dimension of the element mounting portion in the axial direction.

4. A rotating electrical machine for a vehicle according to claim 2, wherein a dimension of the axial fin in the axial direction is larger than a dimension of the element mounting portion in the axial direction.

\* \* \* \* \*